A. A. MARTELL.
ADJUSTABLE BUSHING FOR REAMER SHAFTS.
APPLICATION FILED OCT. 17, 1918.
1,376,451.
Patented May 3, 1921.
2 SHEETS—SHEET 1.
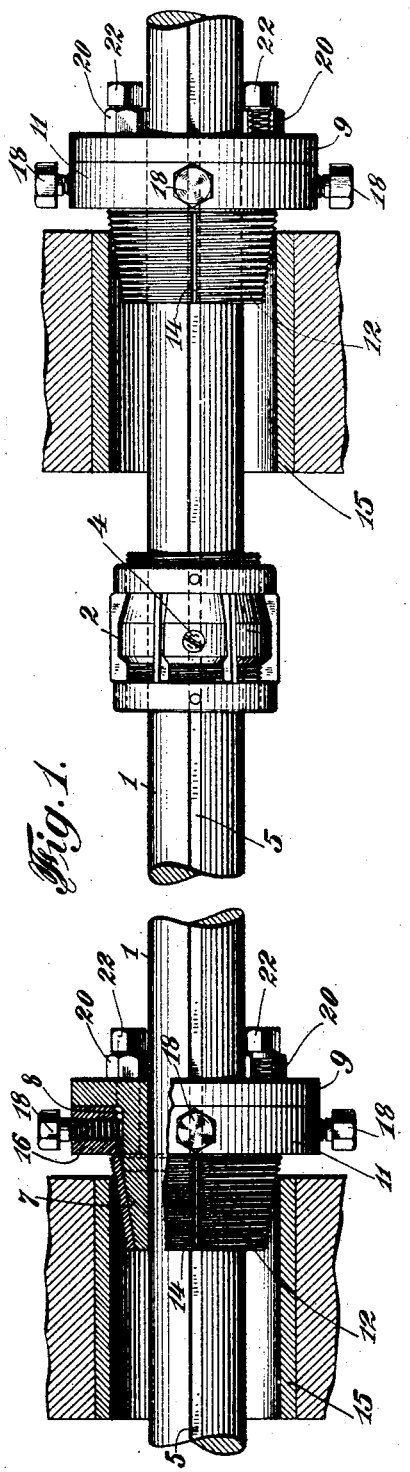
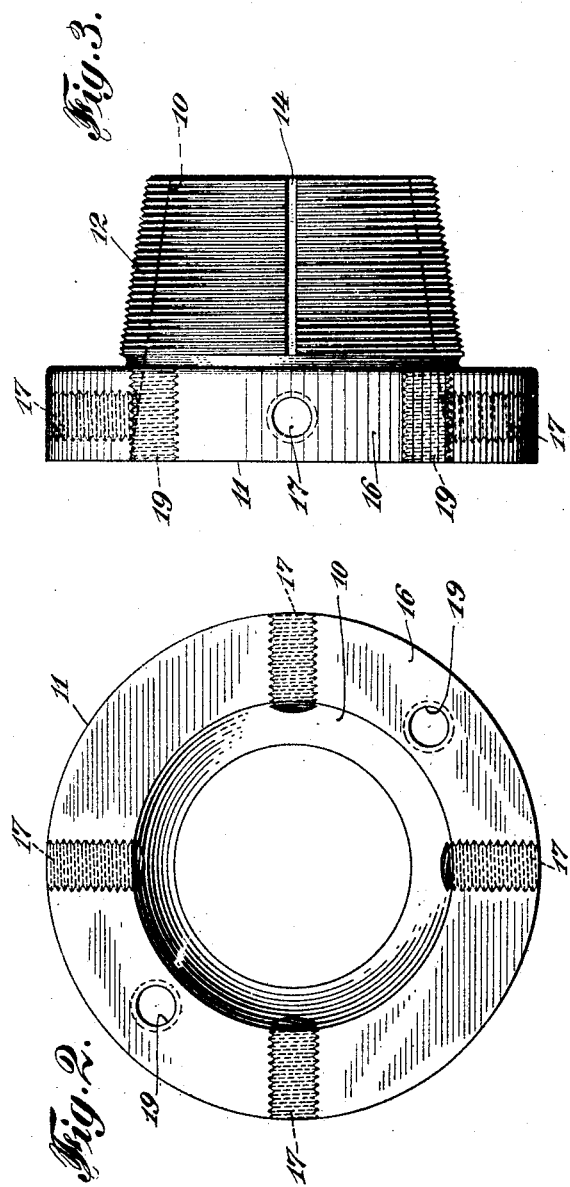
Inventor
Albert A. Martell
By Attorney
George Ramsey A. A. MARTELL.
ADJUSTABLE BUSHING FOR REAMER SHAFTS.
APPLICATION FILED OCT. 17, 1918.

1,376,451.

Patented May 3, 1921.
2 SHEETS—SHEET 2.

Inventor
Albert A. Martell
By Attorney
George Ramsey

UNITED STATES PATENT OFFICE.

ALBERT A. MARTELL, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

ADJUSTABLE BUSHING FOR REAMER-SHAFTS.

1,376,451. Specification of Letters Patent. Patented May 3, 1921.

Application filed October 17, 1918. Serial No. 258,591.

*To all whom it may concern:*

Be it known that I, ALBERT A. MARTELL, a citizen of the United States, residing at Woonsocket, in the county of Providence, State of Rhode Island, have invented certain new and useful Improvements in Adjustable Bushings for Reamer-Shafts, of which the following is a specification.

This invention relates broadly to small tools and more especially to a temporary bearing for reamer shafts and the like, adapted to support a reamer shaft in the permanent bearings that are being reamed.

The principal object of the present invention is a bearing comprising an improvement on my Reissue Patent #14,311, June 5, 1917, and wherein the improved bearing is simplified in manufacture, and also in the manipulation thereof.

Another object of the present invention is an adjustable temporary bearing wherein is provided an anchoring sleeve having a conical bore, and a bearing sleeve provided with a cylindrical portion and a conical portion to fit within the said bore together with diametrically opposed supporting screws for the bushing bearing when the conical portion thereof is withdrawn from the conical bore.

A further object of this invention is a device of the character specified and wherein the parts when in normal position are automatically arranged in such manner that the axis of the reamer shaft bearing is coincident with the axis of the supporting sleeve.

A further object of the present invention is an adjustable bushing as specified and wherein clamping bolts are provided for moving the bearing bushing longitudinally within the conical bore to seat the bearing bushing firmly within the said bore so that the axis of the bearing is coincident with the axis of the screw-threaded conical surface on the anchoring member.

A still further object of the present invention is a device of the character specified wherein the shaft bearing is adapted to be automatically and firmly seated concentric to the anchoring bushing, and at the same time is constructed to be positioned in such manner as to be adjustable relatively to the anchoring bearing.

Other and further objects of the present invention will in part be obvious and will in part be pointed out in the specification following by reference to the accompanying drawings wherein like parts are indicated by like characters throughout the several figures thereof.

Figure 1 is a view showing the bushing bearings supporting a reamer shaft in position in permanent bearings to be reamed.

Fig. 2 is an end view of the anchor member.

Fig. 3 is a side view of the anchor member.

In the operation of the device shown in my above specified reissue patent, there are provided three separate sleeves all of which must be accurately ground and fitted; furthermore, a difficulty is encountered in the use of this type of bearing by the fact that inexperienced operators are not always able to determine the direction in which the axis of the shaft will travel when a bushing is turned. There is also a liability that an inexperienced operator will not notice if the parts are set to zero when beginning a calculation and therefore an erroneous result will be attained. To overcome the foregoing difficulties the present invention is so constructed as to be comprised of but two nested sleeves one of which is the anchor support, and the other of which is the shaft bearing. This construction eliminates an expensive part and therefore is more economical to manufacture. The lateral adjustment members in the present case are constructed in such manner that the adjustment of the axis of the shaft is apparent from the operation of the devices, which may comprise oppositely disposed stub bolts. As long as the bearing sleeve is securely wedged or nested within the anchoring sleeve, the axis of the shaft is coincident with the axis of the supporting conical surface, so that the parts are in zero or non-adjusted relation. This fact is immediately apparent in the present bearing by inspection of the ribs or flanges on the bushings. If these ribs or flanges are in contact, then the parts are in zero position. If they are separated then the bearing is or may be adjusted so that the axis of the shaft is no longer coincident with the axis of the conical surface.

Figure 4:
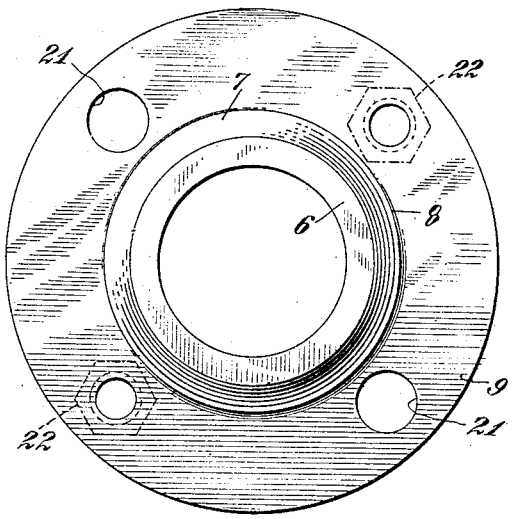
Fig. 4 is an end view shaft bearing bushing.
Figure 5:
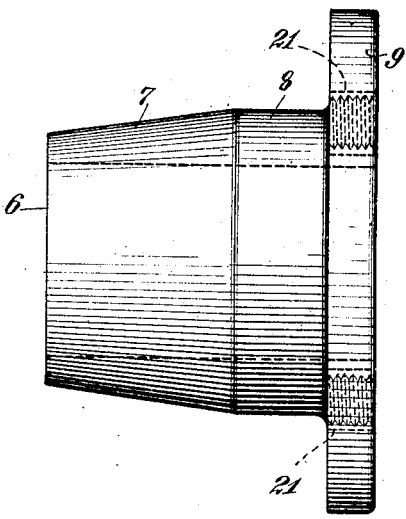
Fig. 5 is a side view of the shaft bearing bushing.

Referring now to the drawings, the reamer shaft 1 carries a reamer 2, which is secured to the reamer shaft by means of the set screw 4, that is adapted to be seated in the groove 5 of the reamer shaft. This reamer shaft is constructed to accurately fit within the bearing bushing 6 of the adjustable temporary bearing. This bearing bushing 6, (Figs. 4 and 5), is provided with an extension or bushing having a conical surface 7 and a cylindrical surface 8 that is adjacent the flange 9. The conical surface 7 on this bearing bushing 6 is ground to accurately fit the ground conical surface 10 of the anchor or supporting bushing 11. This anchor bushing, (Figs. 2 and 3) is provided with an anchor screw-threaded conical exterior surface 12, which at suitable intervals is broken by grooves 14, in order that the screw-threads on the surface 12 may more easily bite into the soft metal of the permanent bearing 15. The anchor bushing 11 is also provided with a flange 16 that is provided with radially extended screw-threaded openings 17, which carry adjustment stub bolts 18. The flange 16 is also provided with other screw-threaded openings 19, the axes of which are parallel to the axis of the bore 10 and these openings are adapted to carry the assembly screw bolts 20 which extend through enlarged openings 21 in the flange 9 of the bearing bushing 6. The bearing bushing 6 also carries short stub screws 22 which may be seated against the face of the flange 11 and adapted to withdraw the bearing bushing from the anchor bushing when the screw bolts 22 are turned in such manner as to be driven through the flange 9.

Figure 6:
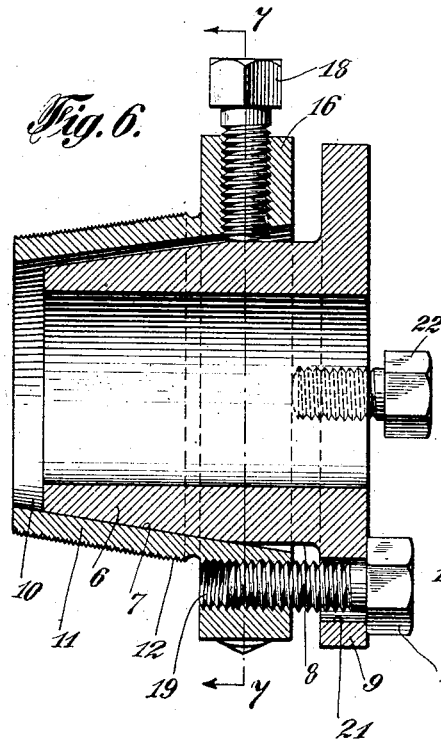
Fig. 6 is a sectional elevational view of the assembled device, taken on line 6—6, Fig. 7.
Figure 7:
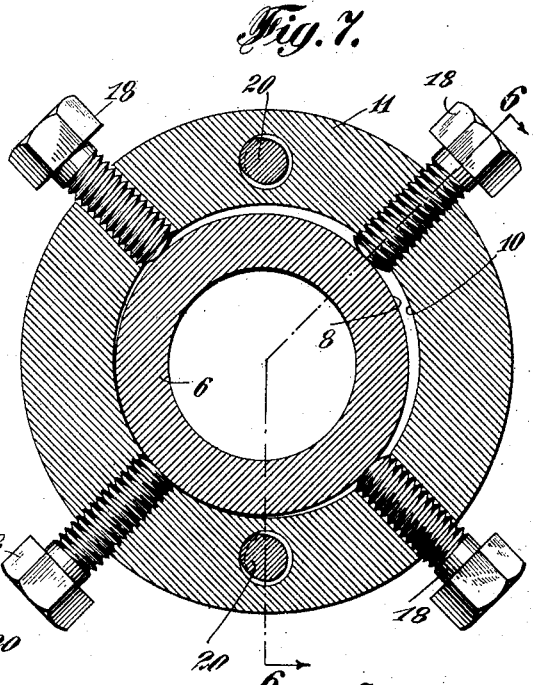
Fig. 7 is a sectional view taken on line 7—7, Fig. 6.

From the foregoing description it is evident that when the parts are in the position indicated in Fig. 1, that the axis of the shaft 1 is coincident with the axis of the conical screw threaded surface 12. It will be apparent that when the assembly stub screws 20 are loosened and the stub screws 22 are turned to be driven through the flange 9 that the bearing bushing 6 is withdrawn from the anchor bore 10 in the anchor bushing 11 so that a clearance is provided between these bushings, as is indicated in Fig. 6. The adjustment stub bolts 18 may now be operated to laterally displace the bearing bushing 6 relatively to the anchor bushing 11, as is indicated in Fig. 7.

By means of these temporary bearings it is evident that the reamer shaft 1 may be supported within permanent bearings 15 that are to be reamed and that the axis of the reamer shaft 1 may be adjusted in such manner that when the reamers 2 are effective to ream the permanent bearings, the axis of the finished permanent bearings will be coincident to the predetermined axis to which the reamer shaft has been adjusted, and that the adjustable bearings for promoting this operation are simple and effective in construction as well as rigid and accurate.

It will also be apparent that by loosening the stub screws 22 and tightening the assembly screws 20 until the flanges 9 and 16 are tightly clamped together that the temporary bearing is in effect a rigid solid member wherein the axis of the shaft bearing is concentric with the axis of the screw-threaded anchor bushing.

Realizing that the present invention may be embodied in structures other than that herein shown and described, I desire the specific disclosure herewith be understood as illustrative and not in a limiting sense.

Having described my invention what I claim is:

1. A temporary bearing for a reamer shaft and adapted to be seated in a permanent bearing to be alined, said temporary bearing comprising an anchoring member having a conical screw-threaded anchoring surface adapted to be secured in a permanent bearing, said anchoring member being provided with a conical bore, a reamer shaft bearing member mounted within said anchoring member and comprising a conical sleeve adapted to accurately fit the conical bore in said anchoring member, oppositely disposed adjustment screws carried by said anchoring member and adapted to support said bearing member when the said bearing member is withdrawn slightly from the said anchoring member, and means to determine the extent of the withdrawal of said bearing member from said anchoring member.

2. A device for alining and reaming shaft bearings and the like and comprising a reamer shaft, a reamer on said shaft, a temporary bearing member having an anchoring member provided with a conical bore, a bearing sleeve having a portion shaped to fit said conical bore, and lateral adjustment means adapted to support and adjust the said bearing member when the same is slightly withdrawn from said anchoring member.

3. A device for alining and reaming shaft bearings and the like and comprising in combination a shaft adapted to carry a reamer, a plurality of adjustable temporary bearings for said shaft, each of said temporary bearings comprising an anchoring member provided with a conical bore, a bearing sleeve mounted within said anchoring member and having a portion fitted to said conical bore when said sleeve is fully seated within said anchoring member, and diametrically opposed adjustment devices constructed to support and guide said bearing when the bearing is slightly withdrawn from the anchoring member.

4. A device for alining and reaming shaft bearings and the like and comprising in combination a shaft adapted to carry a reamer, a reamer mounted on said shaft, and a plurality of adjustable temporary bearings for said shaft, said temporary bearings being adapted to be anchored in permanent bearings to be reamed, said temporary bearings comprising an anchoring member provided with a conical bore, a bearing member having a portion constructed to fit said conical bore, diametrically opposed adjustment and supporting screws carried by said anchoring member and adapted to position and support said bearing member when the same is slightly withdrawn from said anchoring member.

5. A temporary bearing for supporting a reamer shaft for alining and reaming permanent bearings, said temporary bearing comprising an anchoring member and being adapted to be secured to a permanent bearing, a shaft bearing member mounted within said anchoring member and being adapted to be laterally adjustable within said anchoring member, radially movable devices for adjusting and supporting said bearing member within the said anchoring member, a reamer shaft carried by said bearing member, and a reamer upon said shaft and adaptable to ream the permanent bearing to a predetermined axis.

6. A device for supporting a reamer shaft for alining permanent bearings and the like, said device comprising an anchoring member being adapted to be secured to a permanent bearing, means on said anchoring member for attaching the anchoring member to a permanent bearing, a bearing member within said anchoring member, a plurality of radially arranged stub bolts carried by said anchoring member and coöperating with said bearing member to adjustably support said bearing member within said anchoring member, a reamer shaft carried by said bearing member, and a reamer mounted upon said bearing shaft and adapted to ream the permanent bearings to a predetermined axis.

7. A device of the character described comprising in combination an anchoring member provided with a conical bore, a bearing member having a conical portion adapted to fit within and wedge into the conical bore in the anchoring member, means for withdrawing said bearing member from said anchoring member to provide a clearance between said bearing member and said anchoring member, and radially acting adjustment devices carried by said anchoring member and constructed to adjust said bearing member.

8. As an article of manufacture a temporary bearing adapted to be secured in a permanent bearing and provided with an adjustable support for a reamer shaft and the like, said temporary bearing comprising anchoring means adapted to be attached to a permanent bearing by being inserted therein, a shaft bearing extending through said anchoring means adapted to be bodily laterally movable therein without rotation, and radially acting adjustment means for positioning and supporting said bearing member within said anchoring means, a reamer carried by said shaft and adaptable to ream the permanent bearing to a predetermined axis.

9. A temporary bearing for a reamer shaft and adapted to be seated in a permanent bearing to be alined, said temporary bearing comprising an anchoring member having a conical surface adapted to be inserted in a permanent bearing, screw threads on the conical surface of said member, said anchoring member being provided with a conical bore, a reamer shaft bearing member mounted within said anchoring member and comprising a conical sleeve adapted to accurately fit a portion of the conical bore in said anchoring member, a flange on said anchoring member, oppositely disposed adjustment screws carried by said flange on the anchoring member and adapted to support said bearing member when the said bearing member is withdrawn slightly from the said anchoring member, and means to determine the extent of the withdrawal of said bearing member from said anchoring member.

10. A device for alining and reaming shaft bearings and the like and comprising a reamer shaft, a reamer on said shaft, a temporary bearing member having an anchoring member provided with a conical bore, a bearing sleeve having a portion shaped to fit said conical bore, lateral adjustment means adapted to support and adjust the said bearing member when the same is slightly withdrawn from said anchoring member, and means to limit the withdrawal of the said bearing member.

11. A device for alining and reaming shaft bearings and the like and comprising in combination a shaft adapted to carry a reamer, a plurality of adjustable temporary bearings for said shaft, each of said temporary bearings comprising an anchoring member provided with a conical bore, a bearing sleeve mounted within said anchoring member and having a portion fitted to said conical bore when said sleeve is fully seated within said anchoring member, means for causing a relative longitudinal movement between said anchoring member and said bearing sleeve, and diametrically opposed adjustment devices constructed to support and guide said bearing when the bearing is slightly withdrawn from the anchoring member.

12. A device for alining and reaming shaft bearings and the like and comprising in combination a shaft adapted to carry a reamer, a reamer mounted on said shaft, and a plurality of adjustable temporary bearings for said shaft, said temporary bearings being adapted to be anchored in permanent bearings to be reamed, said temporary bearings comprising an anchoring member provided with a conical bore, a bearing member having a portion constructed to fit said conical bore, diametrically opposed adjustment and supporting screws carried by said anchoring member and adapted to position and support said bearing member when the same is slightly withdrawn from said anchoring member, and means to limit the said withdrawal.

13. A temporary bearing for supporting a reamer shaft for alining and reaming permanent bearings, said temporary bearing comprising an anchoring member being adapted to be secured to a permanent bearing, a shaft bearing member mounted within said anchoring member and being adapted to be bodily laterally movable within said anchoring member, devices for adjusting and supporting said bearing member by bodily moving said member within the said anchoring member and without rotating the bearing member during adjustment, and longitudinally movable means to control the relative movement between the shaft bearing member and the anchoring member.

14. A device for supporting a reamer shaft for alining permanent bearings and the like, said device comprising an anchoring member having a conical bore, means on said anchoring member for attaching the anchoring member to a permanent bearing, a bearing member having a conical portion within said anchoring member, a plurality of radially arranged stud bolts carried by said anchoring member and coöperating with said bearing member to adjustably support said bearing member when said conical portion is partially withdrawn from within said anchoring member, and a plurality of longitudinally arranged stub bolts to control the longitudinal movement of said member.

15. A device of the character described comprising in combination an anchoring member provided with a conical bore, a bearing member having a conical portion adapted to fit within and wedge into the conical bore in the anchoring member, means for withdrawing said bearing member from said anchoring member to provide a clearance between said bearing member and said anchoring member, means to control the amount of clearance, and radially acting adjustment devices carried by said anchoring member and constructed to adjust and support said bearing member.

16. As an article of manufacture a temporary bearing adapted to be secured in a permanent bearing and provided with an adjustable support for a reamer shaft and the like, said temporary bearing comprising anchoring means adapted to be attached to a permanent bearing, a flange on said anchoring means, a shaft bearing extending within said anchoring means and adapted to be bodily laterally adjustable therein without rotating said shaft bearing during adjustment, a flange on said shaft bearing, radially acting adjustment means for positioning and supporting said bearing member within said anchoring means, and means to control the amount of adjustment by the separation of the said flanges.

17. As an article of manufacture, a temporary bearing for supporting a reamer shaft for alining and reaming permanent bearings, said temporary bearing comprising an anchoring member having an opening therein and being adapted to be secured to a permanent bearing, a shaft supporting bearing member mounted within said anchoring member and being adapted to be bodily movable laterally within the opening of said anchoring member without rotating the bearing member, and devices for enabling said bodily movement of and for supporting said shaft bearing member within said anchoring member whereby a relative adjustment is permitted between the axis of the shaft bearing member and the axis of said anchoring member.

ALBERT A. MARTELL.